(12) United States Patent
Frachon et al.

(10) Patent No.: US 7,906,959 B2
(45) Date of Patent: Mar. 15, 2011

(54) VARIABLE-RELUCTANCE POSITION SENSOR

(75) Inventors: Didier Frachon, Besancon (FR); Pierre Gandel, Montfaucon (FR)

(73) Assignee: Moving Magnet Technologies, Besancon (FR)

(*) Notice: Subject to any disclaimer, the term of this patent is extended or adjusted under 35 U.S.C. 154(b) by 0 days.

(21) Appl. No.: 10/530,485

(22) PCT Filed: Oct. 7, 2003

(86) PCT No.: PCT/FR03/02949
§ 371 (c)(1),
(2), (4) Date: Sep. 27, 2005

(87) PCT Pub. No.: WO2004/031693
PCT Pub. Date: Apr. 15, 2004

(65) Prior Publication Data
US 2006/0125473 A1 Jun. 15, 2006

(30) Foreign Application Priority Data

Oct. 7, 2002 (FR) ...................................... 02 12425

(51) Int. Cl.
*G01B 7/30* (2006.01)
*G01B 7/14* (2006.01)
(52) U.S. Cl. ............................... 324/207.25; 324/207.24
(58) Field of Classification Search ............. 324/207.25, 324/207.2, 207.21, 207.24, 207.26, 160–180; 73/728
See application file for complete search history.

(56) References Cited

U.S. PATENT DOCUMENTS

| 3,061,771 | A | | 10/1962 | Planer et al. |
| 3,916,326 | A | * | 10/1975 | Woyton ........................... 327/30 |
| 4,424,705 | A | * | 1/1984 | Hattori et al. ................. 73/35.13 |
| 4,745,363 | A | * | 5/1988 | Carr et al. .................... 324/207.2 |
| 4,785,242 | A | | 11/1988 | Vaidya et al. |
| 5,670,876 | A | * | 9/1997 | Dilger et al. ............. 324/207.13 |
| 5,729,128 | A | * | 3/1998 | Bunyer et al. ................. 324/202 |
| 5,781,005 | A | * | 7/1998 | Vig et al. .................... 324/207.2 |
| 6,043,646 | A | * | 3/2000 | Jansseune ................ 324/207.26 |
| 2004/0017190 | A1 | * | 1/2004 | McDearmon et al. ... 324/207.25 |

FOREIGN PATENT DOCUMENTS

| DE | 195 03 075 | 8/1996 |
| DE | 100 09 173 | 9/2001 |
| EP | 0 273 481 | 7/1988 |
| FR | 2 735 222 | 12/2001 |

* cited by examiner

Primary Examiner — Kenneth J Whittington
(74) Attorney, Agent, or Firm — Oblon, Spivak, McClelland, Maier & Neustadt, L.L.P.

(57) ABSTRACT

A variable reluctance analog position device designed to determine the position variation of a target made from a ferromagnetic material. The device includes at least one magnet, the target and the magnet defining a gap therebetween. A magnetosensitive element detects induction variation produced in the gap by relative movement of the target relative to the magnet. The magnet is magnetized in a direction essentially perpendicular to the front surface of the magnet, which defines one edge of the gap. The magnet includes a cavity open at the front surface thereof and the magnetosensitive element is housed in the cavity. Moreover, the target is provided with a specific geometric configuration determined such that the induction variation according to the position of the target corresponds to a pre-defined function.

12 Claims, 5 Drawing Sheets

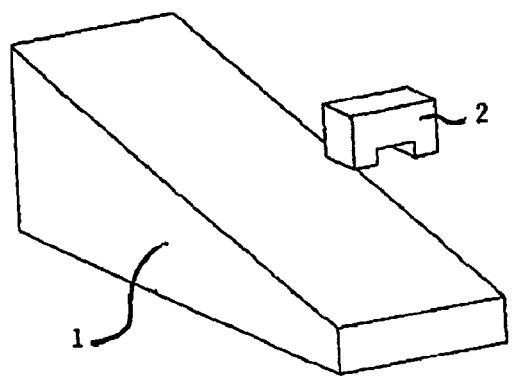
Figure 13
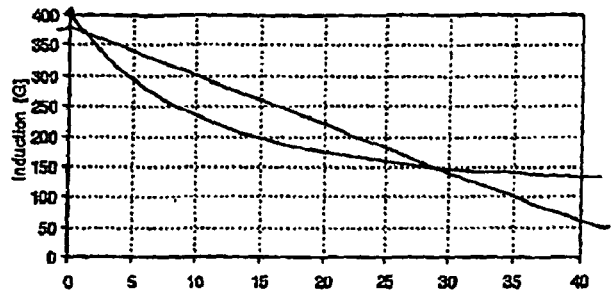
Figure 14
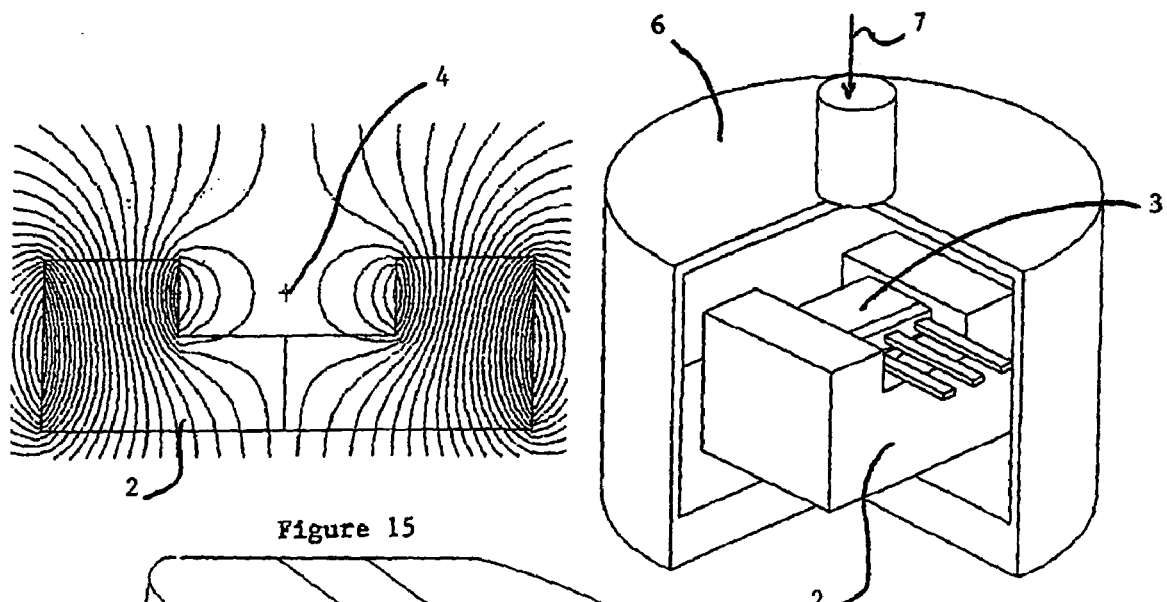
Figure 15
Figure 16
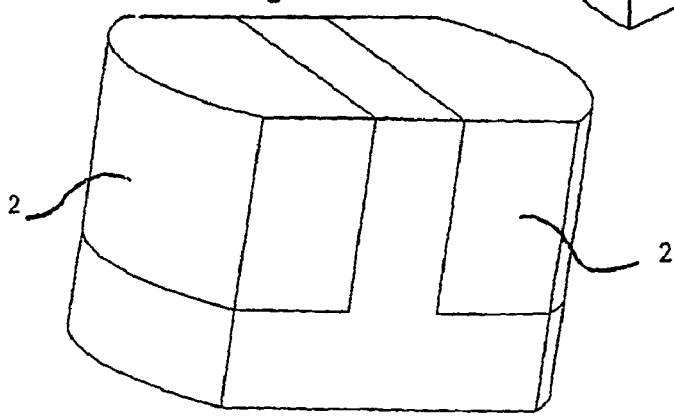
Figure 17

VARIABLE-RELUCTANCE POSITION SENSOR

CROSS REFERENCE TO RELATED APPLICATIONS

This application is based upon and claims priority under 35 U.S.C. §371 from International Patent Application No. PCT/FR03/02949, filed Oct. 7, 2003 and under 35 U.S.C. §119 from French Patent Application No. 02/12425, filed Oct. 7, 2002.

BACKGROUND OF THE INVENTION

The present invention relates to a variable-reluctance analog position transducer device and method. It is applicable in particular but not exclusively to devices suitable for measuring a variation of air gap between a ferromagnetic target and a transducer, the ferromagnetic target being displaced in linear or rotary manner opposite the transducer.

In general, the invention comprises a contactless rotary or linear transducer making it possible to obtain very linear induction variation, with maximum sensitivity. It can find a very particular application in measurement of the liquid level in a reservoir, the target being placed inside the liquid-containing reservoir and the magnet being situated on the outside, thus measuring the position of the target through the reservoir walls.

For better understanding of the invention and of the magnetic transducer devices, it is important hereinafter to understand the notion of "zero gauss".

The measurement position delivering a signal equal to zero gauss corresponds effectively to the point of greatest stability and sensitivity. There is no "offset", or in other words a significant difference relative to zero gauss, to be amplified; only the useful signal has to be processed, thus permitting a larger gain from the electronic viewpoint, leading to a more favorable signal-to-noise ratio. In addition, a temperature-compensating device is necessary to compensate for the reversible change of the magnetic properties of the magnet. The variation of transducer sensitivity as a function of temperature must be compensated for, but the compensation applied cannot be perfect and the influence of these compensation errors will be smaller the smaller the measured inductance is.

At present there exist rotary transducer devices making it possible to obtain an excellent linearity, that is, of ±0.5%, albeit over travels of reduced angular range.

For example, there is already known French Patent No. 2670286 filed in the name of the Applicant, which describes a position transducer provided with a stator defining an air gap, within which there is displaced a mobile magnet integral with a coupling means. The transducer is provided with a Hall-effect sensor for measuring the variation of induction in the air gap. The stator is composed of a first fixed part and a second part that is either fixed or mobile, the two parts defining between one another a main air gap in which there is displaced the part of the mobile element. The mobile element has at least two adjacent thin parts magnetized transversely in alternate sense, the magnetized parts being made of a material having a practically linear demagnetization characteristic and a reversible permeability close to that of air in the entire working range. The fixed part has at least two secondary air gaps substantially perpendicular to the main air gap in which the mobile element is displaced. The Hall-effect sensor is seated in one of the said secondary air gaps.

There is known European Patent No. 0665416, also filed in the name of the Applicant, which describes a magnetic position transducer of the type provided with a radially magnetized thin permanent magnet of tubular shape, integral with a coupling shaft, the said permanent magnet being rotationally mobile in a cylindrical main air gap defined by a yoke and a stator of soft magnetic material, the stator having a secondary air gap in which there is disposed a Hall-effect sensor, characterized in that the stator is disposed coaxially in the interior of the permanent magnet, and in that the yoke ensuring closure of the magnetic flux generated by the permanent magnet is formed by a tubular piece coaxial with the magnet and the rotor.

Transducer devices with digital and not analog output are also found on the market. Such transducers are generally used for detection, that is, the presence or absence of a toothed ferromagnetic target. The output signal of this type of transducer is not proportional to the linear or angular position of this ferromagnetic target, because it has only two states, usually designated 1 or 0, as a function of that which is close to the transducer. Relative to devices of this type, French Patent Nos. 2735222 and 2734913 disclose a proximity transducer comprising a Hall-effect ferromagnetic piece. French Patent No. 2724722, filed in the name of the Applicant, also describes a device that permits the detection, that is, only the presence or absence of a toothed ferromagnetic target.

In the prior art there is known U.S. Pat. No. 4,785,242, which describes a type of angular transducer having a rotor of variable section for ensuring a transfer function between the angular position and the output signal. On the other hand, it does not disclose the characteristic according to which the Hall-effect sensor is seated in a cavity of the permanent magnet.

German Patent Application 19503075 describes a mechanical arrangement for positioning the sensor. This patent application does not disclose anything at all about a variable-reluctance analog position transducer seeking to create zero gauss.

By virtue of the cavity created in the permanent magnet in the device according to the invention, some of the lines of force pass through the cavity, leading to a "negative" field, while the other lines of force pass outside the magnet, leading to a "positive" field, the zero gauss point being situated between these two fields. By virtue of the zero gauss, there are achieved:

temperature stability: 0 gauss=0 gauss at all temperatures,
    better signal amplification, because there is no common mode to be amplified.

The technical solutions disclosed in the foregoing patents may be satisfactory in their particular application, but the major drawback of these devices lies in the fact that the function of measurement of angular position by a variation of the magnetic induction has a maximum travel of only ±90° around the zero gauss position.

At present, therefore, there does not exist any analog and not digital magnetic position transducer capable of determining the position of a ferromagnetic target over a travel comprising one complete revolution, or in other words 360°.

SUMMARY OF THE INVENTION

The invention therefore has more particularly as its objective the elimination of this deficiency. To this end it proposes a variable-reluctance analog position transducer intended to determine the variation of position of a target, comprising a target made of a ferromagnetic material and at least one magnet, the target and the magnet defining between one another an air gap, the device additionally being provided with a magnetosensitive element for detecting the variation of induction caused in the air gap by the displacement of the target relative to the magnet, characterized in that the magnet is magnetized along a direction substantially perpendicular to the front surface of the magnet bounding one edge of the air gap, the said magnet having a cavity opening on the said front surface of the magnet, the magnetosensitive element being seated in the said cavity, the target having a geometric configuration designed such that the variation of induction as a function of the said position of the target corresponds to a predefined function.

By virtue of these particular features, the invention therefore makes it possible to manufacture, very simply, both linear and rotary transducers making it possible to have excellent linearity and, for the rotary transducers, maximum travels close to 360°, with a mean or initial induction to be measured close to zero gauss.

In addition, the device according to the invention has a clearly lower manufacturing cost and a great variety of transducers with different target shapes or geometry, for both linear and rotary transducer applications.

Preferably, the said magnet will be U-shaped.

According to one option offered by the invention, the target will be rotationally mobile around a shaft perpendicular to the axis of magnetization of the said magnet.

According to another option offered by the invention, the target will be rotationally mobile around a shaft parallel to the axis of magnetization of the said magnet.

According to one advantageous aspect of the invention, the plane in which displacement of the target takes place is included in a plane passing through the center of the magnetosensitive element.

Advantageously, the magnetosensitive element will be seated in a cavity or seat of the magnet.

Similarly, the target will be displaced along an axis perpendicular to the axis of magnetization of the said magnet.

According to one aspect of the invention, the target will have a particular or optimized shape, suitable for delivering a linear induction B as a function of the displacement of the said target.

According to one option offered by the invention, it will be possible for the magnetosensitive element to be a Hall-effect sensor. Similarly, it will be possible for this magnetosensitive element to be a magnetoresistor.

Advantageously, the device of the invention will be provided with a ferromagnetic piece adhesively bonded to the back of the aforesaid magnet.

It will also be possible for the aforesaid magnet to have the form of half magnets adhesively bonded to a T-shaped ferromagnetic piece.

In addition, according to one option offered by the invention, it will be possible for the magnetosensitive element to be a sensor of "intelligent" type, such as a "HAL 855—Micronas" sensor, whose output voltage is a programmable function. In this case, it will be possible for the target to have any shape whatsoever, that is, it will not have to be constructed or formed by means of the method given hereinafter for construction of a target according to the invention.

According to a particularly interesting aspect of the invention, it will be possible for the magnetosensitive element to have a mean or initial induction close to zero gauss.

The present invention also relates to a method for construction of a target made of a ferromagnetic material, having a desired induction signal B, intended to be employed in a linear or rotary analog magnetic position transducer device provided with the said target, a magnet associated with a magnetosensitive element, characterized in that it comprises the following steps:

establishment of a first geometric shape for the aforesaid target, positioning of points on the target; these points having coordinates (x, y) in a viewing plane of spatial coordinates (x, y, z), calculation of the magnetic induction signal B as a function of the linear or rotary displacement of the target; the displacement of the target being effected over a predefined trajectory, modification of the coordinates of one of the aforesaid points and recalculation of the induction B as a function of the position of the target in order to determine the influence of this point on the induction B measured by the aforesaid magnet, determination of a matrix and solving of an equation suitable for defining the new geometric shape of the aforesaid first shape determined previously for the target, repetition of the aforesaid calculation, modification and determination steps until there is obtained a magnetic induction B as a function of the linear or rotary displacement of the target, satisfying, that is, in conformity with the desired linearity criteria, or until there is obtained a nonlinear function f(x).

BRIEF DESCRIPTION OF THE DRAWINGS

The invention will be understood better by means of the description, provided hereinafter for purely explanatory purposes, of embodiments of the invention with reference to the attached figures:

FIG. 13 illustrates a target having a plane profile, situated opposite the device according to the invention, and being displaced linearly opposite the said device;

FIG. 14 illustrates a graph relating to the induction perceived by the magnetosensitive element of the device and the output signal corrected, that is, linearized by a programmable "intelligent" sensor, such as a HAL 855 sensor, as a function of the position of the target illustrated in FIG. 13;

FIG. 15 is a view in section of a U-shaped magnet provided with a parallelepiped seat, at the center of which there is situated the "zero gauss" point;

FIG. 16 illustrates an embodiment of the device according to the invention. In this particular embodiment, the target is composed of a deformable ferromagnetic membrane which, under the effect of a force or pressure, modifies the air gap between the aforesaid target and the transducer magnet.

FIG. 17 illustrates a perspective view of the magnet installed on a T-shaped ferromagnetic pole piece in order to permit a zero gauss position to be obtained.

DETAILED DESCRIPTION OF THE INVENTION

One of the principles of the invention is to create an analog induction variation of low mean value, such as a few hundred gauss, which consists in a function of the linear or angular position of a ferromagnetic piece and which can be exploited by a magnetosensitive element.

As is evident in the different figures, the variable-reluctance analog position transducer intended to determine the position of a target 1 includes the said target 1 of ferromagnetic material, having a supposedly infinite permeability, a permanent magnet 2 and an element sensitive to the sense and intensity of a magnetic field, referred to hereinafter as "magnetosensitive element" 3, such as a Hall-effect sensor, disposed in the air gap formed between magnet 2 and target 1.

Magnet 2 is a magnet having two poles, one of the poles being directed from the edge of the air gap over the surface of the magnet forming the side of the air gap, the other pole being on the opposite side.

The magnetization is oriented in a direction perpendicular to these two sides, in one sense or the other. The magnetization is perpendicular to the surface of the magnet directed toward the air gap.

In the case of a target that is translationally mobile along a plane substantially parallel to the pole surfaces of the magnet, the variation of induction results from the variation of the air gap, or in other words the space between the cross section of target 3 and the cross section of magnet 1 disposed opposite one another. This variation results from the geometric configuration of the target, determined by calculation or experimentation, so that the distance between the surface of the target and the magnet varies as a function of the relative position on the translation trajectory, according to a specified curve.

In the case of a target that is translationally mobile along an axial direction, that is, perpendicular to the pole surfaces of the magnet, the variation of induction results from the axial position of the target relative to the magnet.

In the case of a target that is rotationally mobile in a plane substantially parallel to the pole surfaces of the magnet, the variation of induction results from the variation of thickness of the target in the radial direction.

Figure 20:
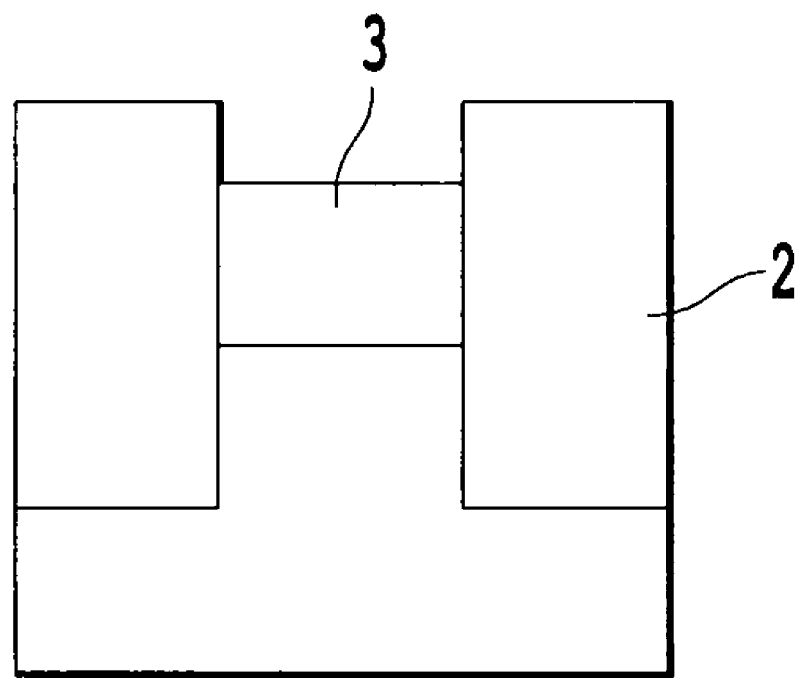
FIG. 20 illustrates a side view of a magnet with a magnetosensitive element installed on a T-shaped ferromagnetic pole piece.

Magnetosensitive element 3 of the sensor is ideally placed as close as possible to "zero gauss" point 4, as illustrated in FIG. 15 for a substantially U-shaped configuration of magnet 2. Also conceivable is a magnet 2 adhesively bonded to a T-shaped ferromagnetic piece as illustrated in FIG. 17. FIG. 20 illustrates a side view of this embodiment, showing a magnet 2 with a magnetosensitive element 3 installed on a T-shaped ferromagnetic pole piece. In both cases it is possible, by virtue of the shape of magnet 2, to obtain a position in the interior of the magnet such that the induction is relatively close to zero gauss.

The value of the induction will be modified by the presence of the target, and this modification will be directly related to the air gap between the target and the magnet/magnetosensitive element assembly.

In the different cases illustrated in the figures, the displacement of target 1 takes place along an axis substantially perpendicular to the magnetization of magnet 2.

The profile of target 1 in the plane under consideration can be related to a function of type $Z=f(x)$. The magnetic induction generated by magnet 2 at a given point A of its axis Z is then a linear function of type $B=k*x+b$. The profile of target 1 is obtained by a coupling between the magnetic simulation software and a mathematical algorithm for shape optimization, by virtue of which the method of the invention is achieved.

In the present invention, optimization of target 1 is not absolutely necessary; in fact, it is possible to use a ferromagnetic target 1 of simple shape by combining magnet 2 with an "intelligent" sensor such as that of the HAL 855—Micronas type, making it possible to program the output signal so as to obtain any desired function, especially one that is linear as a function of the displacement, the table of values being stored in the sensor beforehand.

For the manufacturer and the person skilled in the art, this invention makes it possible to send a linear signal for a given target 1, but this invention also makes it possible to send any kind of signal whatsoever, for which purpose it is sufficient to adapt the shape of target 1 to the desired output signal or more simply to program an "intelligent" sensor, such as one of the "MICRONAS HAL 855" type, with the appropriate function.

Figure 1:
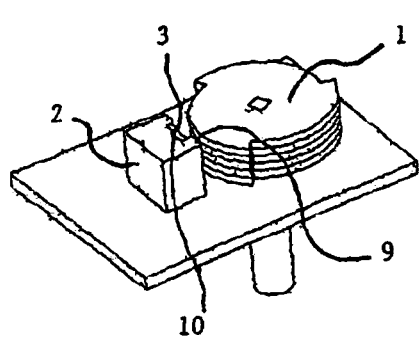
FIG. 1 illustrates a practical example of a device according to the invention suitable for obtaining a linear signal of 3×120°.
Figure 2:
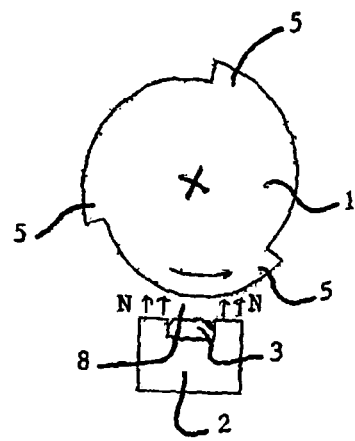
FIG. 2 is a view from above of the device illustrated in FIG. 1.
Figure 3:
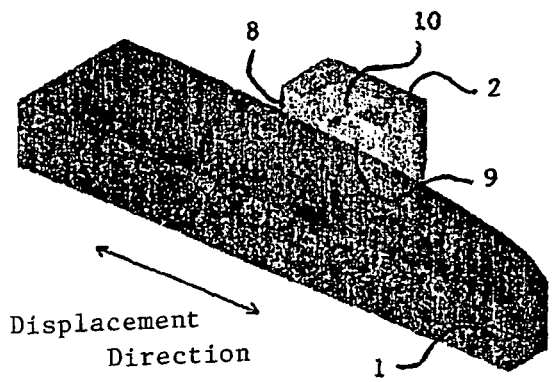
FIG. 3 is a device according to the invention provided with a target with linear displacement.
Figure 4:
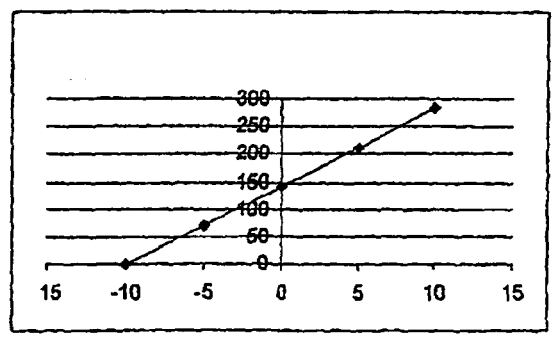
FIG. 4 illustrates a graph relating to the induction B of the device illustrated in FIG. 3.

In an example chosen to illustrate the invention and presented in FIG. 3, the device according to the invention includes a target having a length of 40 mm. By virtue of the method for constructing a target having an adapted profile or shape, the result of the induction perceived by the magnet/magnetosensitive element assembly during displacement of target 1 at five points over a range of twenty millimeters is, as illustrated in FIG. 4, a perfect straight line, corresponding to excellent linearity of the induction as a function of the displacement.

Although a target 1 having such a length is chosen, it will naturally be possible in practice to obtain a longer travel.

Figure 5:
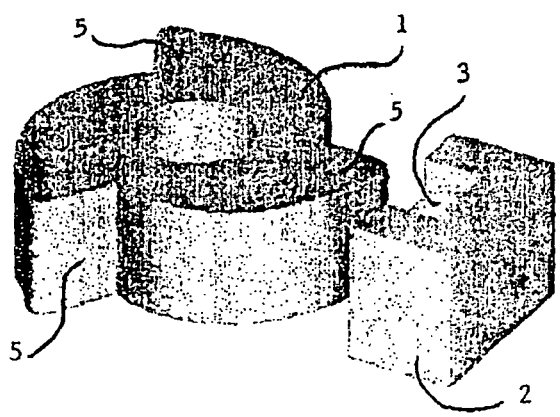
FIG. 5 is a device according to the invention provided with a target with rotary displacement.

In the case illustrated in FIG. 5, the device of the invention includes a target 1 having three spiral teeth 5, each disposed at an angle of 120° and having a length of 20 millimeters. It will also be possible to envision targets 1 having one, two or more than three spiral teeth 5, in order to obtain a particular induction.

Figure 6:
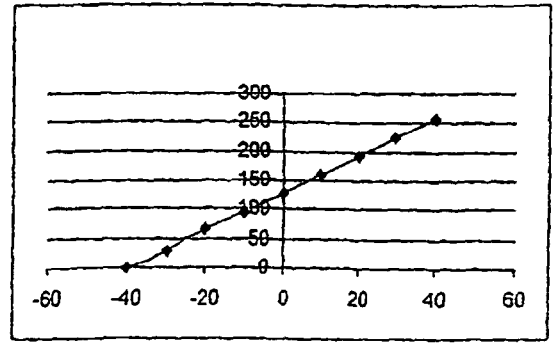
FIG. 6 illustrates a graph relating to the induction B of the device illustrated in FIG. 5.
Figure 7:
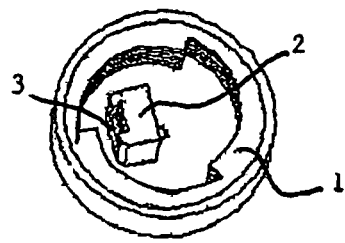
FIG. 7 is a perspective view of the device illustrated in FIG. 1, except for the fact that the magnet is located in the interior of the target.
Figure 8:
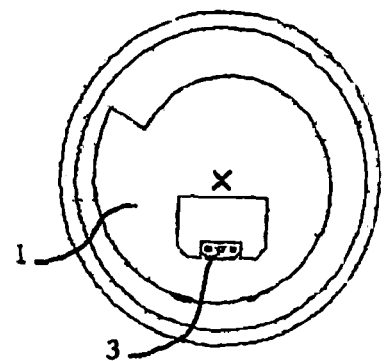
FIG. 8 is a view from above of the device illustrated in FIG. 7.
Figure 9:
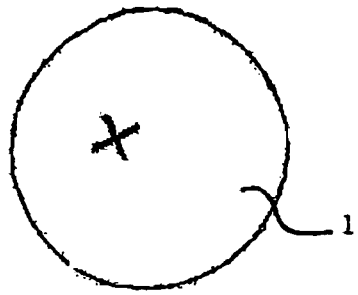
FIG. 9 is a view from above of a device according to the invention in which the target has cylindrical shape and is displaced in an eccentric rotary manner that permits a signal of 2×180° to be obtained.
Figure 10:
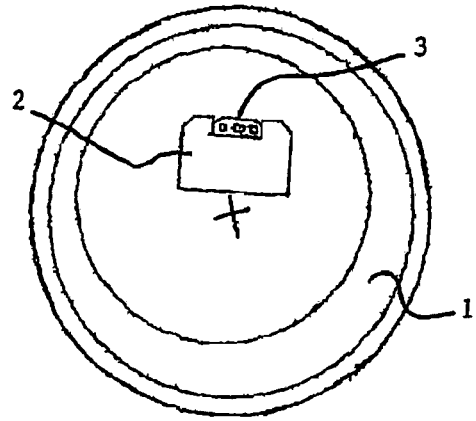
FIG. 10 illustrates the same device as that of FIG. 9, except for the fact that the magnet is located in the interior of the target.
Figure 11:
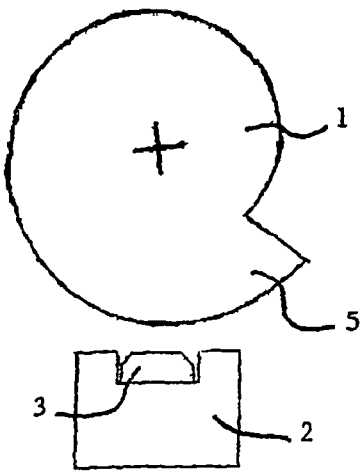
FIG. 11 is a view from above of the device according to the invention, in which the target is rotary, thus permitting a linear signal over 360° to be obtained.
Figure 12:
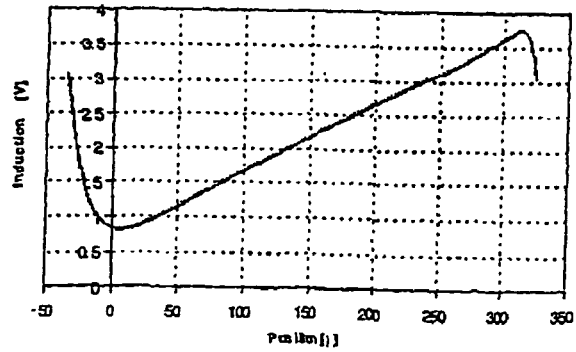
FIG. 12 is a graph relating to the variation of the induction signal as perceived by the device according to the invention for one complete revolution of the target, meaning over 360°.
Figure 18:
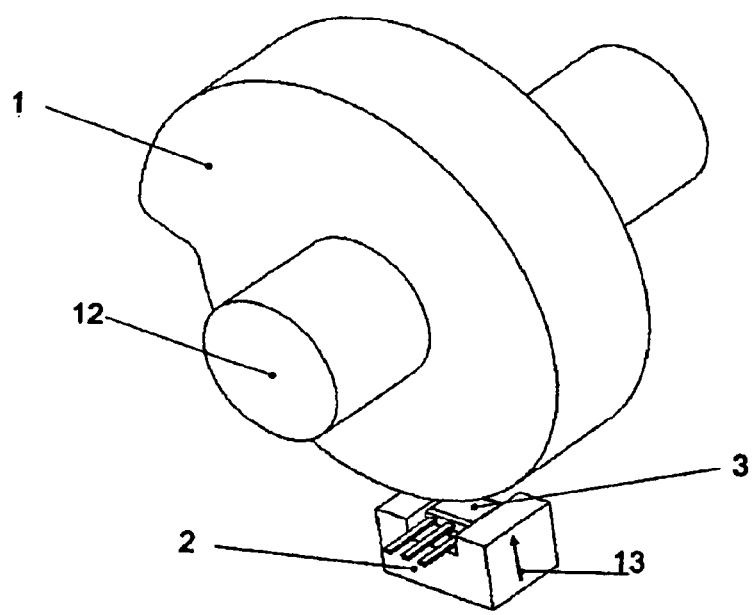
FIG. 18 illustrates an exemplary embodiment where a target is rotationally mobile around a shaft perpendicular to an axis of magnetization of a magnet.
Figure 19:
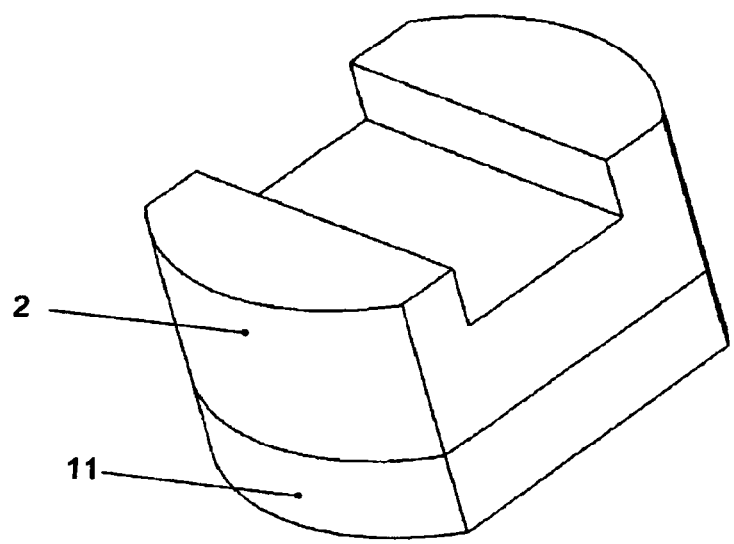
FIG. 19 illustrates an exemplary embodiment where a magnet is bonded to the back of a ferromagnetic piece.

FIG. 6 shows the results pertaining to the induction of the magnet/magnetosensitive element assembly during displacement of target 1 at nine points over a range of 80°. In a manner identical to the foregoing, excellent linearity is obtained over this displacement range.

As is evident in FIG. 16, the magnet 2 and magnetosensitive element 3 assembly is in one embodiment of the invention disposed opposite a ferromagnetic membrane 6, which can be deformed under the effect of a force 7 applied vertically relative to the said membrane 6. When applied, force 7 therefore induces a deformation of the aforesaid membrane 6 that then modifies the air gap between this membrane 6 and the assembly comprising magnet and magnetosensitive element.

This variation of air gap will produce a variation of induction at the magnetosensitive element 3 which could be linked to the force applied on the aforesaid membrane. This transducer can be used in particular in applications of measurement of mass for automobile seats.

One of the objectives of the present invention is to propose a ferromagnetic target 1 having a linear response of the induction of the magnet/magnetosensitive element assembly. Thus the present invention proposes a method suitable for forming or defining the appropriate geometric shape of this target in such a way as to obtain the aforesaid linear response. Of course, it is currently interesting and desirable in numerous applications to obtain linearity of the induction, although it will be possible to achieve all other forms of this induction, up to very particular induction curves or plots.

Initially, therefore, a geometric shape is chosen for target 1, and the exterior shape or configuration of the target, that is, facing the magnet/magnetosensitive element assembly, is defined by means of a "spline" function passing through n points p defined by their coordinates (x, y). The shape of the profile of target 1 facing the magnet/magnetosensitive element assembly will be ideally chosen initially such that, in the opinion of the person skilled in the art, it best approximates the final shape of the said profile.

The induction perceived by the magnetosensitive element of the device according to the invention is simulated for k linear or angular positions of the target (where k>1). By means of these k values, there is defined a functional relationship of the following type:

$$J(p) = \Sigma |I(x_k, p) - f(x_k)|$$

With this functional relationship it is possible to quantity the difference between the simulated induction values $I(x_k, p)$ and a function $f(x_k)$ that we wish to obtain.

The next step makes it possible to quantify the influence of the n points of target 1 on the induction perceived by magnetosensitive element 3 for the k positions of the aforesaid target 1. Each of the n points of target 1 is modified, and the calculation of the induction perceived by magnetosensitive element 3 is repeated with this new target 1 for the k linear or angular positions of target 1. In this way there is obtained a matrix A of dimensions k*(n+1) defined with the k induction values simulated by the (n+1) targets 1. It remains to solve the equation below to find the vector d (n components) corresponding to the deformation to be applied to the target in order to tend toward the chosen output signal.

$$(A^t A + \lambda I)d = -A^t \phi(p), \text{ where } \phi_k(p) = |I(x_k, p) - I_k|$$

The steps are then repeated until an induction response or perception of the induction by the magnetosensitive element that is obtained is sufficiently close to a predefined function.

In the foregoing, the invention is described by way of example. It is understood that the person skilled in the art is capable of constructing different versions of the invention without departing from the scope of the patent.

The invention claimed is:

1. A variable-reluctance analog position transducer configured to determine a position of a target, comprising:
   a target made of a ferromagnetic material, the target being rotationally mobile around a shaft perpendicular to an axis of magnetization of at least one magnet, the target including three spiral teeth, each disposed at an angle of 120°;
   the target and the at least one magnet defining between one another an air gap; and
   a magnetosensitive element detecting a magnetic induction caused by a presence of the target and related to the air gap between the target and the at least one magnet, wherein the at least one magnet has a unidirectional magnetization along a direction substantially perpendicular to a front surface of the at least one magnet bounding one edge of the air gap, the at least one magnet having a cavity opening on the front surface of the at least one magnet, the magnetosensitive element being seated in the cavity, the target having a geometric configuration such that the induction as a function of the position of the target corresponds to a predefined linear function.

2. A variable-reluctance analog position transducer according to claim 1, wherein the target is rotationally mobile around a shaft parallel to an axis of magnetization of the at least one magnet.

3. A variable-reluctance analog position transducer according to claim 1, wherein a plane in which displacement of the target takes place is included in a plane passing through the center of the magnetosensitive element.

4. A variable-reluctance analog position transducer according to claim 1, further comprising a ferromagnetic piece adhesively bonded to a back of the at least one magnet.

5. A variable-reluctance analog position transducer according to claim 4, wherein the at least one magnet is adhesively bonded to a T-shaped ferromagnetic piece.

6. A variable-reluctance analog position transducer target according to claim 1, wherein the target has a particular or optimized shape, configured to deliver a linear induction as a function of the displacement of the target.

7. A variable-reluctance analog position transducer according to claim 1, wherein the magnetosensitive element is placed in the cavity in a zone of minimal induction.

8. A variable-reluctance analog position transducer according to claim 1, wherein a maximum measurable angular travel is close to 360°.

9. An angular position transducer for a camshaft or crankshaft, provided with an analog position sensor according to claim 1.

10. A variable-reluctance analog position transducer according to claim 1, wherein the induction as a function of the position of the target is a linear function across the entire maximum measurable angular travel.

11. A variable-reluctance analog position transducer according to claim 1, wherein a maximum measurable angular travel is 360°, and the induction as a function of the position of the target is a linear function across the entire maximum measurable angular travel.

12. A method for construction of a target for an analog position transducer made of a ferromagnetic material, having a desired induction signal, the transducer including,
    a target made of a ferromagnetic material;
    at least one magnet, the target and the at least one magnet defining between one another an air gap;
    a magnetosensitive element detecting a magnetic induction caused in the air gap by displacement of the target relative to the at least one magnet, wherein the at least one magnet is magnetized along a direction substantially perpendicular to a front surface of the at least one magnet bounding one edge of the air gap, the at least one magnet having a cavity opening on the front surface of the at least one magnet, the magnetosensitive element being seated in the cavity, the target having a geometric configuration such that the induction as a function of the position of the target corresponds to a predefined function, the method comprising:

establishing a first geometric shape for the target;

positioning points on the target, the points having coordinates in a viewing plane of spatial coordinates;

calculating a magnetic induction signal as a function of linear or rotary displacement of the target, the displacement of the target being effected over a predefined trajectory;

modifying coordinates of one of the points and recalculating the induction as a function of the position of the target to determine influence of this point on the induction measured by the at least one magnet;

determining a matrix and solving an equation configured to define a new geometric shape of the first shape determined previously for the target; and repeating the calculating, modifying, and determining until a magnetic induction as a function of the linear or rotary displacement of the target is obtained satisfying in conformity with desired linearity criteria, or until a non-linear function is obtained.

* * * * *